Figure 1:
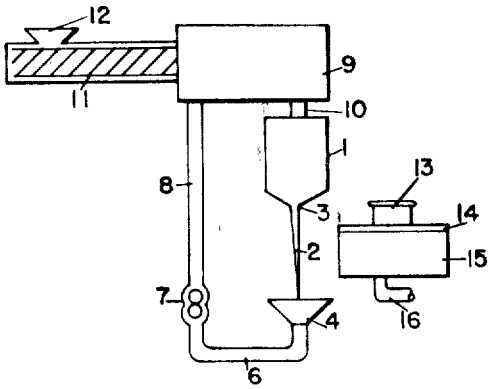
Figure 2:
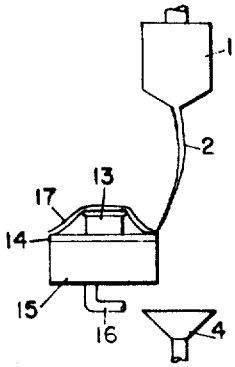
Figure 3:
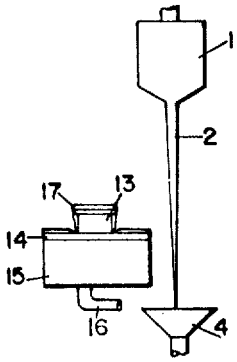
Figure 4:
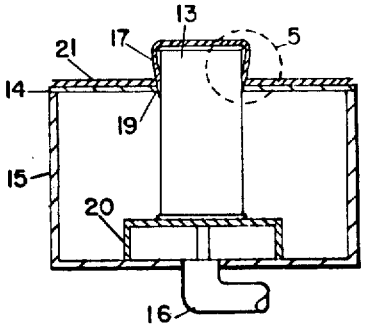
Figure 5:
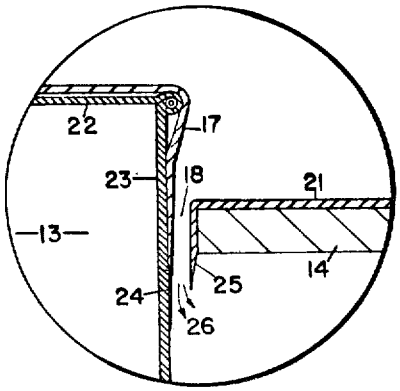
Figure 6:
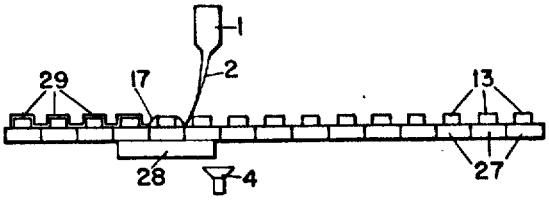

427-294 SR
FIP8003 OR T 857,040

DEC 24 1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1038

T 857,040

T622,866

METHOD FOR APPLYING PLASTIC DUST COVERS TO CONTAINERS

Rex Eells and David E. Stooksbury, both of P.O. Box 511, Kingsport, Tenn. 37662

Filed Mar. 10, 1967. Published Dec. 24, 1968
Class 53—14
1 Sheet Drawing. 13 Pages Specification

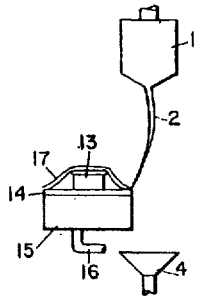

FIG. 2

A method for applying plastic dust covers to containers, which comprises (1) placing an air-impermeable skirt around the middle portion of a container positioned with its end which is to be protected by a dust cover projecting upwardly through an opening in said skirt, (2) said skirt being spaced away from said container so as to form an annular opening having a radial dimension of 1/16" to 1/4", (3) passing the combination of said skirt and said container through a falling curtain of molten thermoplastic material so as to apply a continuous coating of said thermoplastic material over the surfaces of said container projecting above said skirt, (4) applying an atmospheric pressure drop across said annular opening to force said molten thermoplastic material downwardly through said opening, and (5) recovering said container coated with a solidified, continuous film of said thermoplastic material extending over all of the surfaces of said container above said skirt.

427-294 SR

FIP8003 OR T 857,040

Rex Eells
David E. Stooksbury
INVENTORS

BY William J. Fryer
Charles L. Good
ATTORNEYS